(12) United States Patent
Xia et al.

(10) Patent No.: US 11,956,153 B2
(45) Date of Patent: *Apr. 9, 2024

(54) SYSTEMS AND METHODS FOR ADAPTING A WAN EGRESS SHAPER RATE

(71) Applicant: Cisco Technology, Inc., San Jose, CA (US)

(72) Inventors: Hongbo Xia, Shanghai (CN); Xiaorong Wang, Shanghai (CN); Yu Zhang, Shanghai (CN); Changhong Shen, Shanghai (CN)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/734,566

(22) Filed: May 2, 2022

(65) Prior Publication Data

US 2022/0263761 A1 Aug. 18, 2022

Related U.S. Application Data

(63) Continuation of application No. 16/891,624, filed on Jun. 3, 2020, now Pat. No. 11,329,924.

(51) Int. Cl.
*H04L 47/22* (2022.01)
*H04L 47/24* (2022.01)
*H04L 47/34* (2022.01)

(52) U.S. Cl.
CPC .............. *H04L 47/22* (2013.01); *H04L 47/24* (2013.01); *H04L 47/34* (2013.01)

(58) Field of Classification Search
CPC .......... H04L 47/22; H04L 47/24; H04L 47/34
See application file for complete search history.

(56) References Cited

U.S. PATENT DOCUMENTS

| 9,729,241 B2 | 8/2017 | Goodson et al. |
| 9,729,452 B2 | 8/2017 | Averi et al. |
| 9,769,695 B2 | 9/2017 | Pan et al. |

(Continued)

FOREIGN PATENT DOCUMENTS

| CN | 110996103 A | * | 4/2020 |
| KR | 102033402 B1 | * | 11/2019 |

OTHER PUBLICATIONS

KR_102033402_B1_I English Translation (Year: 2019).*
CN_110996103_A_Zhang English Translation (Year: 2020).*

*Primary Examiner* — Chi H Pham
*Assistant Examiner* — Weibin Huang
(74) *Attorney, Agent, or Firm* — Baker Botts L.L.P.

(57) ABSTRACT

In one embodiment, a method includes determining, by a first network component, a sender shaper drop value based on the following: a maximum sequence number; a minimum sequence number; and a sender sequence counter number associated with the first network component. The method also includes determining, by the first network component, a wide area network (WAN) link drop value based on the sender sequence counter number associated with the first network component and a receiver sequence counter number associated with a second network component. The method further includes determining, by the first network component, whether to adjust a sender shaper rate based on the sender shaper drop value and the WAN link drop value.

17 Claims, 3 Drawing Sheets

(56) References Cited

U.S. PATENT DOCUMENTS

| | | |
|---|---|---|
| 10,164,895 B2 | 12/2018 | Ovsiannikov |
| 10,523,570 B2 | 12/2019 | Iyer et al. |
| 11,329,924 B2 * | 5/2022 | Xia .................. H04L 47/22 |
| 2002/0059483 A1 | 5/2002 | Park |
| 2002/0120766 A1 | 8/2002 | Okajima |
| 2008/0117834 A1 | 5/2008 | Ohno |
| 2012/0215936 A1 * | 8/2012 | Yang ................. H04L 47/22 |
| | | 709/235 |
| 2015/0089046 A1 | 3/2015 | Waxman |
| 2016/0028637 A1 | 1/2016 | Vasseur |
| 2016/0127944 A1 * | 5/2016 | Pan .................. H04L 47/22 |
| | | 370/252 |
| 2016/0352469 A1 | 12/2016 | Xiao |
| 2017/0163527 A1 * | 6/2017 | Vasseur ............. H04L 47/20 |
| 2017/0324629 A1 * | 11/2017 | Iyer ................. H04L 12/66 |
| 2017/0366362 A1 | 12/2017 | Sakai |
| 2019/0349259 A1 | 11/2019 | Rovner |
| 2021/0385166 A1 | 12/2021 | Xia |

* cited by examiner

SYSTEMS AND METHODS FOR ADAPTING A WAN EGRESS SHAPER RATE

PRIORITY

This application is a continuation, under 35 U.S.C. § 120, of U.S. patent application Ser. No. 16/891,624 filed on Jun. 3, 2020, which is hereby incorporated by reference in its entirety.

TECHNICAL FIELD

The present disclosure relates generally to adapting a shaper rate, and more specifically to systems and methods for adapting a wide area network (WAN) egress shaper rate.

BACKGROUND

Network traffic shaping is a bandwidth management technique that delays transmission of packets until they can be brought into compliance with a desired traffic profile. Network traffic shaping may use one or more Quality of Service (QoS) policies to sort traffic into classes and queue packets that exceed a configured shaping rate. The active bandwidth capacity may need to be detected to apply these QoS policies to the network traffic. Detecting active bandwidth capacity may include sending short bursts of bi-directional traffic and measuring the received rate, which severely impacts user traffic.

DESCRIPTION OF EXAMPLE EMBODIMENTS

Overview

According to an embodiment, a first network component includes one or more processors and one or more computer-readable non-transitory storage media coupled to the one or more processors. The one or more computer-readable non-transitory storage media include instructions that, when executed by the one or more processors, cause the first network component to perform operations including determining a sender shaper drop value based on the following: a maximum sequence number; a minimum sequence number; and a sender sequence counter number associated with the first network component. The operations also include determining a WAN link drop value based on the sender sequence counter number associated with the first network component and a receiver sequence counter number associated with a second network component. The operations further include determining whether to adjust a sender shaper rate based on the sender shaper drop value and the WAN link drop value.

In certain embodiments, the operations include determining, based on the WAN link drop value, that a WAN link connecting the first network component to the second network component dropped at least one sequence during a first monitoring cycle and decreasing, in response to determining that the WAN link dropped the at least one sequence, the sender shaper rate for a second monitoring cycle.

In some embodiments, the operations include determining, based on the sender shaper drop value, that a QoS policy dropped at least one sequence during a first monitoring cycle and increasing, in response to determining that the QoS policy dropped the at least one sequence, the sender shaper rate for a second monitoring cycle.

In certain embodiments, the operations include determining, based on the WAN link drop value and the sender shaper drop value, that a number of packets encapsulated at the first network component equals a number of packets decapsulated at the second network component during a first monitoring cycle and continuing, in response to determining that the number of packets encapsulated at the first network component equals the number of packets decapsulated at the second network component, the sender shaper rate for a second monitoring cycle.

In some embodiments, the operations include subtracting the minimum sequence number from the maximum sequence number to generate a sequence range number, adding a value of one to the sequence range number to generate a modified sequence range number, and calculating the sender shaper drop value by subtracting the sender sequence counter number from the modified sequence range number.

In certain embodiments, the operations include receiving the receiver sequence counter number from the second network component and calculating the WAN link drop value by subtracting the receiver sequence counter number from the sender sequence counter number. In some embodiments, the sender sequence counter number and the receiver sequence counter number are associated with the same sequence range.

According to another embodiment, a method includes determining, by a first network component, a sender shaper drop value based on the following: a maximum sequence number; a minimum sequence number; and a sender sequence counter number associated with the first network component. The method also includes determining, by the first network component, a WAN link drop value based on the sender sequence counter number associated with the first network component and a receiver sequence counter number associated with a second network component. The method further includes determining, by the first network component, whether to adjust a sender shaper rate based on the sender shaper drop value and the WAN link drop value.

According to yet another embodiment, one or more computer-readable non-transitory storage media embody instructions that, when executed by a processor, cause the processor to perform operations including determining, by a first network component, a sender shaper drop value based on the following: a maximum sequence number; a minimum sequence number; and a sender sequence counter number associated with the first network component. The operations also include determining, by the first network component, a WAN link drop value based on the sender sequence counter number associated with the first network component and a receiver sequence counter number associated with a second network component. The operations further include determining, by the first network component, whether to adjust a sender shaper rate based on the sender shaper drop value and the WAN link drop value.

Technical advantages of certain embodiments of this disclosure may include one or more of the following. Certain systems and methods described herein determine whether to adjust a session shaper rate based on the measured shaper loss and WAN link loss. If both the shaper and the WAN link are measured with no loss (or within a certain threshold), user traffic rate is low, and there is no need to adapt the shaper rate. If the WAN link is measured with loss (or in excess of a certain loss threshold), the WAN link active bandwidth is oversubscribed, and the shaper rate is decreased to reduce or prevent subsequent WAN link drops (regardless of whether shaper loss is measured or not). If only shaper loss is measured, the current shaper rate cannot fully utilize the capability of WAN bandwidth, and the shaper rate is increased to more efficiently utilize the WAN link. As such, the session shaper rate is adjusted without introducing any additional probing that utilizes available bandwidth capacity and thus impacts user traffic.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

This disclosure describes systems and methods for adapting a WAN egress shaper rate. In certain software defined WAN (SD-WAN) solutions, adaptive Quality of Service (QoS) involves dynamically adapting a WAN egress shaper rate according to the active WAN circuit bandwidth capability. SD-WAN adaptive QoS becomes more imperative with the diversity of unstable WAN connectivity such as the Internet, digital subscriber line (DSL), 3G, 4G, and Long Term Evolution (LTE). The available bandwidth for Internet and DSL links varies with the network congestion state, and the available bandwidth for 3G/4G/LTE links varies with user scale and ratio efficiency. The primary challenge of SD-WAN adaptive QoS is to measure the active WAN bandwidth capacity reliably and effectively without impact to user traffic.

A traditional approach to detecting active bandwidth for adaptive QoS in a network involves testing the active bandwidth by sending short bursts of bi-directional traffic and measuring the received rate. However, this approach utilizes available bandwidth capacity, which severely impacts user traffic. Another approach adapts bandwidth based on a WAN path loss measurement and feedback. This approach measures the loss between a sender (e.g., a hub) and a receiver (e.g., a spoke) in the network by counting send and receive packets of certain tunnel end-points. If loss is detected, the sender decreases its shaper rate. Otherwise, the sender increase its shaper rate. The algorithm used for this approach requires a training period to estimate sender and receiver counter clock shift. The clock shift itself varies, which results in an inaccurate loss measurement. Also, this approach only measures WAN link loss. If traffic throughput is low and no WAN link loss is detected, the sender shaper rate will keep increasing.

Figure 1:
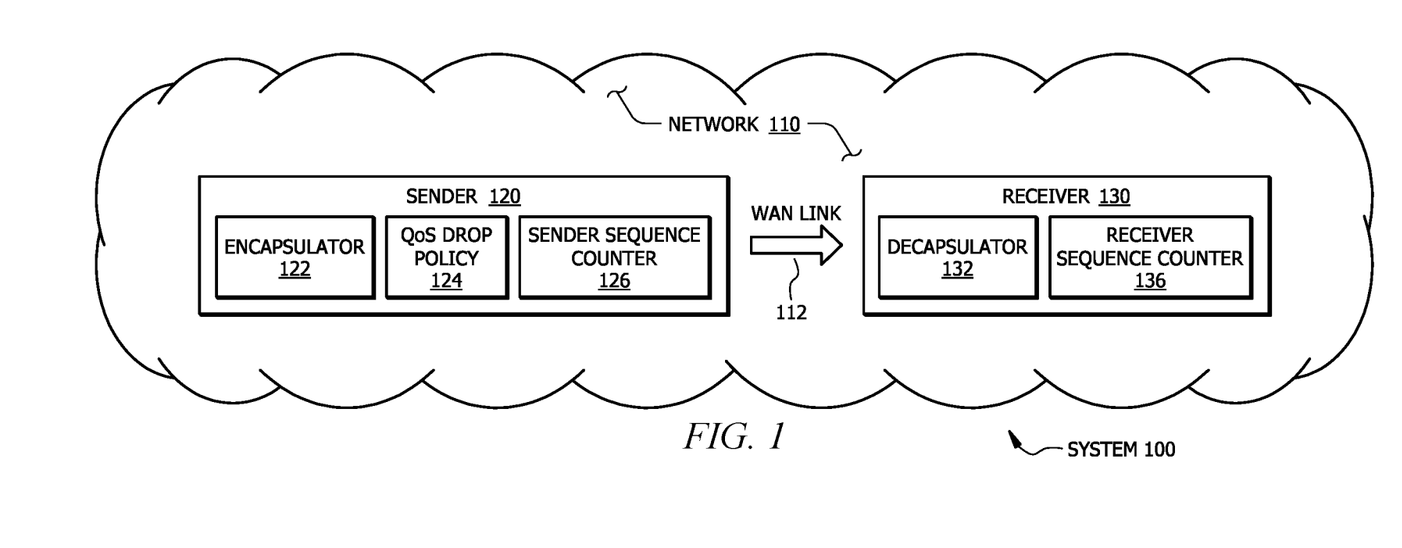
FIG. 1 illustrates an example system for adjusting a sender shaper rate based on a sender shaper drop value and a WAN link drop value.
Figure 2:
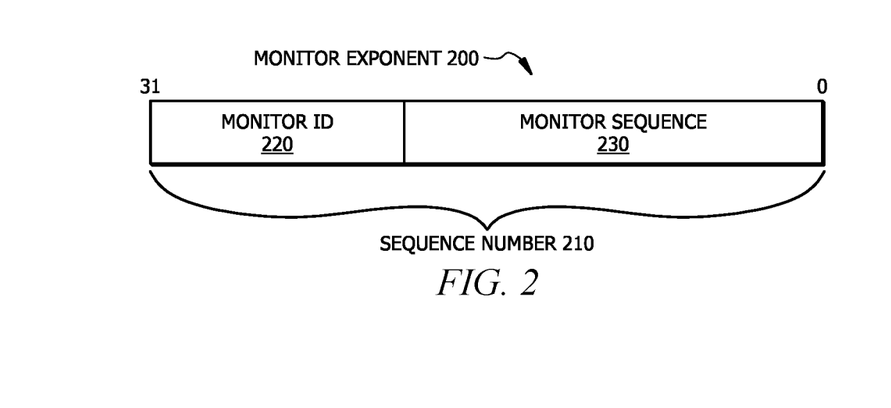
FIG. 2 illustrates an example monitor exponent that may be used by the system of FIG. 1.
Figure 3:
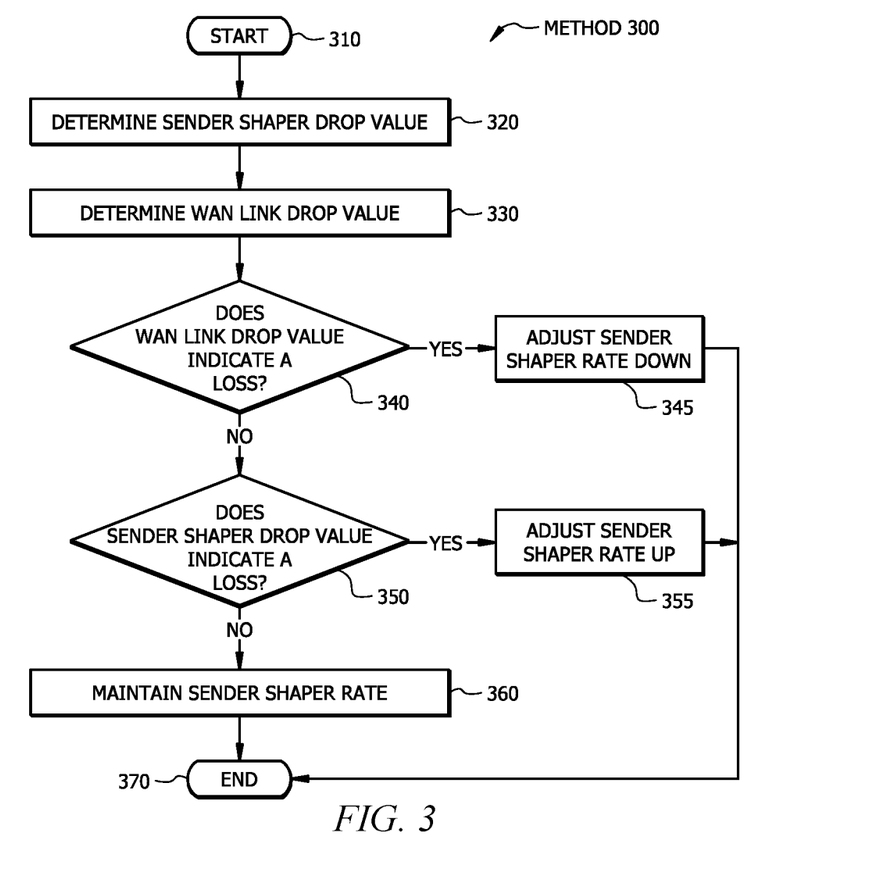
FIG. 3 illustrates an example method for adjusting a sender shaper rate based on a sender shaper drop value and a WAN link drop value.
Figure 4:
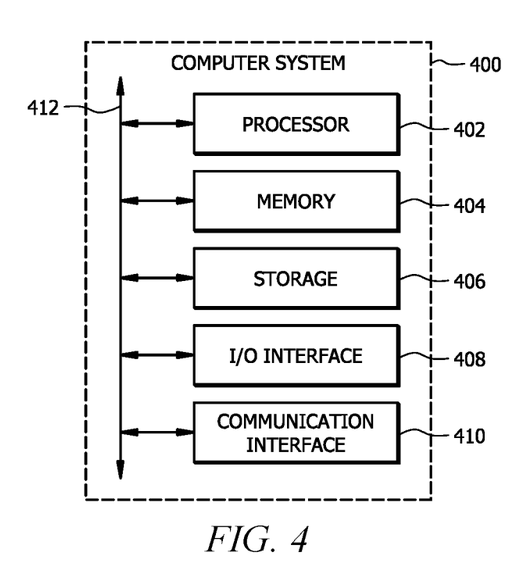
FIG. 4 illustrates an example computer system that may be used by the systems and methods described herein.

This disclosure addresses the issues above by determining the egress shaper rate based on accurately measured shaper loss and WAN link loss. FIG. 1 shows an example system for adjusting a sender shaper rate based on a sender shaper drop value and a WAN link drop value, and FIG. 2 shows an example monitor exponent that may be used by the system of FIG. 1. FIG. 3 shows an example method for adjusting a sender shaper rate based on a sender shaper drop value and a WAN link drop value. FIG. 4 shows an example computer system that may be used by the systems and methods described herein.

FIG. 1 illustrates an example system 100 for adjusting a sender shaper rate based on a sender shaper drop value and a WAN link drop value. System 100 or portions thereof may be associated with an entity, which may include any entity, such as a business or company that adjusts shaper rates. The components of system 100 may include any suitable combination of hardware, firmware, and software. For example, the components of system 100 may use one or more elements of the computer system of FIG. 4. System 100 of FIG. 1 includes a network 110, a WAN link 112, a sender 120, an encapsulator 122, a QoS drop policy 124, a sender sequence counter 126, a receiver 130, a decapsulator 132, and a receiver sequence counter 136.

Network 110 of system 100 is any type of network that facilitates communication between components of system 100. Network 110 may connect one or more components of system 100. One or more portions of network 110 may include an ad-hoc network, an intranet, an extranet, a virtual private network (VPN), a local area network (LAN), a wireless LAN (WLAN), a WAN, a wireless WAN (WWAN), an SD-WAN, a metropolitan area network (MAN), a portion of the Internet, a portion of the Public Switched Telephone Network (PSTN), a cellular telephone network, a DSL, a 3G network, a 4G network, an LTE network, a combination of two or more of these, or other suitable types of networks. Network 110 may include one or more different types of networks. Network 110 may be any communications network, such as a private network, a public network, a connection through Internet, a mobile network, a WI-FI network, etc. Network 110 may use Multiprotocol Label Switching (MPLS) or any other suitable routing technique. One or more components of system 100 may communicate over network 110. Network 110 may include a core network (e.g., the Internet), an access network of a service provider, an Internet service provider (ISP) network, and the like.

In the illustrated embodiment of FIG. 1, network 110 uses WAN link 112 to communicate between sender 120 and receiver 130. WAN link 112 may allow sender 120 and receiver 130 to connect over a wide geographic area without using the public Internet. WAN link 112 may be established through s satellite link, a telephone copper wire, a fiber optic cable, and the like. WAN link 112 is associated with an available active bandwidth. The available active bandwidth of WAN link 112 may vary with time.

Sender 120 of system 100 is a network component (e.g., a router, a switch, a server, etc.) that sends traffic to receiver 130 of system 100 via WAN link 112. Sender 120 may receive, create, process, store, and/or send traffic to other network components within network 110. In certain embodiments, sender 120 acts as a hub to one or more spokes (e.g., receiver 130) within network 110. In the illustrated embodiment of FIG. 1, sender 120 includes an encapsulator 122, a QoS drop policy 124, and a sender sequence counter 126.

Encapsulator 122 of sender 120 is an application that encapsulates packets for secure transportation on network 110. In certain embodiments, encapsulator 122 may use an Internet Protocol (IP) packet encapsulation protocol such as Generic Routing Encapsulation (GRE) to encapsulate packets. In some embodiments, encapsulator 122 may use a security protocol for encrypting and/or authenticating IP packets such as IP Security (IPSec) Encapsulating Security Payload (ESP) to encapsulate packets. In certain embodiments, encapsulator 122 provides origin authenticity through source authentication, data integrity through hash functions, and/or confidentiality through encryption protection for IP packets.

Both IPSec and GRE overlay sessions have (or can have) a packet sequence number. In certain embodiments, encapsulator 122 assigns a sequence number to every encapsulated packet. The sequence numbers assigned by encapsulator 122 may be sequential. For example, each sequence number may be a 32 bit, monotonically increasing sequence number that is incremented by 1 for every packet that is encapsulated. In some embodiments, the sequence number is included to protect against replay attacks. The sequence numbers assigned by encapsulator 122 range from a minimum sequence number to a maximum sequence number. In certain embodiments, encapsulator 122 communicates the encapsulated packets to QoS drop policy 124.

QoS drop policy 124 of sender 120 is a policy that buffers and queues excess packets above committed rates. In certain embodiments, QoS drop policy 124 retains excess packets in a queue and then schedules the excess for later transmission over increments of time. QoS drop policy 124 may sort traffic into classes and queue packets that exceed the configured shaping rates.

Sender sequence counter 126 of sender 120 is an application that counts the number of packets that are to be transmitted to receiver 130. In certain embodiments, sender sequence counter 126 counts packets in a specific sequence range after the packets have been encapsulated by encapsulator 122 and/or after QoS drop policy 124 has been applied to the packets. Sender sequence counter 126 may include a counter value that increases by one for each packet that is to be transmitted to receiver 130. Sender sequence counter 126 may be initialized to zero for each monitor cycle such that the first packet received by sender sequence counter 126 within a particular monitor cycle will be given a value of one, the second packet received by sender sequence counter 126 within the particular monitor cycle will be given a value of two, the third packet received by sender sequence counter 126 within the particular monitor cycle is given a value of three, and so on. When the monitor cycle ends, the sender sequence counter 126 is again initialized (e.g., set to zero). The monitor cycle represents the period in which sequence numbers ranging from the minimum sequence number to the maximum sequence number are counted. The monitor cycle may be associated with a particular IPSec session, a particular GRE session, and the like.

In certain embodiments, sender sequence counter 126 determines a sender shaper drop value. The sender shaper drop value is the number of sequences that have been dropped by QoS drop policy 124. The sender shaper drop value may be calculated based on a maximum sequence number, a minimum sequence number, and a sender sequence counter number. For example, sender sequence counter 126 may calculate a sequence range number by subtracting the minimum sequence number from the maximum sequence number, add a value of one to the sequence range number to generate a modified sequence range number, and calculate the sender shaper drop value by subtracting the sender sequence counter number from the modified sequence range number. In some embodiments, sender sequence counter 126 of sender 120 determines a shaper loss rate. The shaper loss rate represents the percentage of sequences that have been dropped by QoS drop policy 124. The shaper loss rate may be calculated by dividing the modified sequence range number by the sender shaper drop value.

In some embodiments, encapsulator 122 of sender 120 is located between QoS drop policy 124 and sender sequence counter 126. For example, encapsulator 122 may be located between QoS drop policy 124 and sender sequence counter 126 for crypto offload platforms. When QoS drop policy 124 is applied to incoming packets prior to encapsulator 122 encapsulating the packets, sender sequence counter 126 may use sender local shaper drop statistics to calculate the sender shaper drop value and/or sender shaper loss rate in lieu of (or in addition to) using sequence numbers.

Receiver 130 of system 100 is a network component (e.g., a router, a switch, a server, etc.) that receives traffic from sender 120 of system 100 via WAN link 112. Receiver 130 may receive, create, process, store, and/or send traffic to other network components within network 110. In certain embodiments, receiver 130 acts as a spoke to a hub (e.g., receiver 130) within network 110. In the illustrated embodiment of FIG. 1, receiver 130 includes a decapsulator 132 and a receiver sequence counter 136.

Decapsulator 132 of receiver 130 is an application that decapsulates packets that have been encapsulated by encapsulator 122. In certain embodiments, decapsulator 132 may use GRE to decapsulate the packets. In some embodiments, decapsulator 132 may use an IPSec ESP to decapsulate the packets. Decapsulator 132 may use any suitable procedure (e.g., an ordinary ESP decapsulation procedure, a standard GRE decapsulation procedure, a tunnel mode decapsulation Network Address Translation (NAT) procedure, etc.) to decapsulate the packets. In certain embodiments, decapsulator 132 communicates the decapsulated packets to receiver sequence counter 136.

Receiver sequence counter 136 of receiver 130 is an application that counts the number of packets received by receiver 130. In certain embodiments, receiver sequence counter 136 counts packets in a specific sequence range after the packets have been decapsulated by decapsulator 132 and/or an anti-reply sanity check has been performed. Receiver sequence counter 136 is applied on the same sequence range (i.e., from the minimum sequence number to the maximum sequence number) as sender sequence counter 126.

Receiver sequence counter 136 includes a counter value that increases by one for each packet received from sender 120. Receiver sequence counter 136 may be initialized to zero for each monitor cycle such that the first packet received by receiver sequence counter 136 within a particular monitor cycle is given a value of one, the second packet received by receiver sequence counter 136 within the particular monitor cycle is given a value of two, the third packet received by receiver sequence counter 136 within the particular monitor cycle is given a value of three, and so on. When the monitor cycle ends, the receiver sequence counter 136 is again initialized (e.g., set to zero). The monitor cycle represents the period in which sequence numbers ranging from the minimum sequence number to the maximum sequence number are counted. The monitor cycle may be associated with a particular IPSec session, a particular GRE session, and the like.

In certain embodiments, the receiver counter value determined by receiver sequence counter 136 indicates missing sequences. The missing sequences may be due to one or more sequence numbers that have been dropped by QoS drop policy 124 and/or one or more sequence numbers that have been dropped by WAN link 112. Receiver sequence counter 136 may communicate the receiver counter value to sender 120.

One or more components of system 100 (e.g., sender 120 or receiver 130) may determine a WAN link drop value. The WAN link drop value indicates the number of sequences that were dropped by WAN link 112. In certain embodiments, the WAN drop link value is calculated by subtracting the receiver sequence counter number from the sender sequence counter number. In certain embodiments, receiver sequence counter 136 determines a WAN loss rate. The WAN loss rate represents the percentage of sequences that have been dropped by WAN link 112. The WAN loss rate may be calculated by dividing the sender sequence counter number by the WAN link drop value.

Even though the WAN link drop value is calculated using values obtained from different counters (i.e., the sender sequence counter number obtained from sender sequence counter 126 and the receiver sequence counter number obtained from receiver sequence counter 136), the WAN link drop value is accurately calculated since receiver sequence counter 136 is applied on the same sequence range as sender sequence counter 126. For each monitor cycle, the sequence number range monitored by receiver sequence counter 136 of receiver 130 is synchronized with the sequence number range monitored by sender sequence counter 126 of sender 120. By synchronizing the sequence number range between receiver 130 and sender 120 for each monitor cycle, the WAN link drop value and the WAN loss rate can be accurately determined.

One or more components of system 100 may determine whether to adjust a sender shaper rate based on the sender shaper drop value and/or the WAN link drop value. The SD-WAN overlay session shaper rate adapting algorithm may be based on periodically measured shaper loss (e.g., the sender shaper drop value) and WAN link loss (e.g., the WAN link drop value). In certain embodiments, sender 120 and/or receiver 130 of system 100 may determine to decrease the sender shaper rate in response to determining that WAN link 112 was measured with a loss (or a loss greater than a predetermined loss threshold). For example, sender 120 may determine from the WAN link drop value that WAN link 112 dropped at least one sequence number during a first monitoring cycle. In response to determining that WAN link 112 experienced a loss (or a loss greater than a predetermined loss threshold), sender 120 may adjust the sender shaper rate down for a second monitoring cycle. Adjusting the sender shaper rate down may reduce or eliminate the number of sequences dropped by WAN link 112 in the second monitoring cycle.

In some embodiments, sender 120 and/or receiver 130 of system 100 may determine to increase the sender shaper rate in response to determining that the shaper was measured with a loss (or a loss greater than a predetermined loss threshold). For example, sender 120 may determine from the sender shaper drop value that QoS drop policy 124 dropped at least one sequence number during the first monitoring cycle. In response to determining that the shaper experienced a loss (or a loss that exceeded a predetermined loss threshold), sender 120 may adjust the sender shaper rate up for a second monitoring cycle. Adjusting the sender shaper rate up may result in a more efficient utilization of WAN link 112.

In certain embodiments, sender 120 and/or receiver 130 of system 100 may determine to maintain the current sender shaper rate in response to determining that the shaper and WAN link 112 are measured with no loss (or a loss greater than a predetermined loss threshold). For example, sender 120 may determine from the WAN link drop value and the sender shaper drop value that WAN link 112 and QoS drop policy 124 did not drop any packets (e.g., the number of packets encapsulated at encapsulator 122 equals the number of packets decapsulated at decapsulator 132) during a first monitor cycle. In response to determining that the shaper and WAN link 112 are measured with no loss (or a loss greater than a predetermined loss threshold), sender 120 may maintain the sender shaper rate used in the first monitor cycle for the second (subsequent) monitoring cycle.

In operation, during a first monitor cycle, sender 120 of system 100 receives packets from one or more components of network 110. Encapsulator 122 of sender 120 encapsulates the packets and sequentially assigns each encapsulated packet a sequence number starting with a minimum sequence number and ending with a maximum sequence number. Encapsulator 122 then communicates the encapsulated packets to QoS drop policy 124. QoS drop policy 124 determines whether to delay (e.g., drop) one or more of the encapsulated packets. QoS drop policy 124 communicates the encapsulated packets that have not been delayed to sender sequence counter 126. Sender sequence counter 126 counts the encapsulated packets received from QoS drop policy to generate a sender sequence counter number. Sender sequence counter 126 then communicates the encapsulated packets to decapsulator 132 of receiver 130 via WAN link 112. WAN link 112 determines whether to drop packets that exceed a configured maximum rate. Decapsulator 132 of receiver 130 decapsulates the packets received from sender 120 and communicates the decapsulated packets to receiver sequence counter 136 of receiver 130. Receiver sequence counter 136 counts the decapsulated packets received from sender 120 to generate a receiver sequence counter number. Receiver sequence counter 136 then communicates the receiver sequence counter number to sender 120.

Sender 120 determines a sender shaper drop value based on the maximum sequence number, the minimum sequence number, and a sender sequence counter number. For example, sender sequence counter 126 of sender 120 may subtract the minimum sequence number from the maximum sequence number to generate a sequence range number, add a value of one to the sequence range number to generate a modified sequence range number, and calculate the sender shaper drop value by subtracting the sender sequence counter number from the modified sequence range number. Sender 120 determines a WAN link drop value based on the sender sequence counter number and the receiver sequence counter number. For example, sender 120 may calculate the WAN link drop value by subtracting the receiver sequence counter number from the sender sequence counter number. Sender 120 determines whether to adjust a sender shaper rate based on the sender shaper drop value and the WAN link drop value.

If the WAN link drop value and the sender shaper drop value are both measured with no loss (or a loss greater than a predetermined loss threshold), sender 120 maintains the sender shaper rate for the second monitoring cycle since the user traffic rate is low. If the WAN link drop value is measured with loss (or a loss greater than a predetermined loss threshold), sender 120 decreases the sender shaper rate for a second monitoring cycle to help prevent WAN link 112 from dropping a sequence during the second subsequent monitoring cycle. If the sender shaper drop value indicates that the shaper was measured with loss (or a loss greater than a predetermined loss threshold), sender 120 increases the sender shaper rate for the second monitoring cycle to more efficiently utilize WAN link 112 during the second subsequent monitoring cycle. As such, system 100 adapts the sender shaper rate without additional overhead to WAN link 112, which reduces the impact to user traffic across WAN link 112.

Although FIG. 1 illustrates a particular arrangement of network 110, WAN link 112, sender 120, encapsulator 122, QoS drop policy 124, sender sequence counter 126, receiver 130, decapsulator 132, and receiver sequence counter 136, this disclosure contemplates any suitable arrangement of network 110, WAN link 112, sender 120, encapsulator 122, QoS drop policy 124, sender sequence counter 126, receiver 130, decapsulator 132, and receiver sequence counter 136. For example, encapsulator 122 of sender 120 may be located between QoS drop policy 124 and sender sequence counter 126.

Although FIG. 1 illustrates a particular number of networks 110, WAN links 112, senders 120, encapsulators 122, QoS drop policies 124, sender sequence counters 126, receivers 130, decapsulators 132, and receiver sequence counters 136, this disclosure contemplates any suitable number of networks 110, WAN links 112, senders 120, encapsulators 122, QoS drop policies 124, sender sequence counters 126, receivers 130, decapsulators 132, and receiver sequence counters 136. For example, system 100 may include more than one WAN link 112 and/or more than one receiver 130.

FIG. 2 illustrates an example monitor exponent 200 that may be used by the system of FIG. 1. Monitor exponent 200 represents a sequence number 210 that may be generated by encapsulator 122 of FIG. 1. In certain embodiments, sender 120 of and receiver 130 of FIG. 1 share the same monitor exponent 200 to ensure that sender 120 and receiver 130 have the same monitor sequence range (e.g., 0bxx . . . x00 . . . 0, 0bxx . . . x11 . . . 1). Thus, the sender sequence counter number generated by sender 120 of FIG. 1 and the receiver sequence counter number generated by receiver 130 of FIG. 1 can be merged to calculate the sender shaper drop value and the WAN link drop value.

In the illustrated embodiment of FIG. 2, monitor exponent 200 is a 32-bit sequence number. Monitor exponent 200 may be represented as two segments: a monitor ID 220 and a monitor sequence 230. One or more components of system 100 of FIG. 1 may dynamically adjust monitor exponent 200 according to the previous monitor cycle. For example, if the last monitor cycle is less than a minimum predetermined time period (e.g., 30 seconds), receiver 130 may double the range of monitor sequence 230. As another example, if the last monitor cycle is within a predetermined time period (e.g., between 30 seconds and five minutes), receiver 130 may halve the range of monitor sequence 230. The length of monitor ID is adjusted as required to accommodate the adjusted length of monitor sequence 230.

For an IPSec or GRE overlay session that is kept silent or experiences a low user traffic rate for a predetermined amount of time, current monitor exponent 200 may be large enough that the monitor period may exceed the maximum predetermined adapting period (e.g., five minutes). Since no real-time monitor results are available, the sender shaper and the WAN link are treated as if they experienced no loss.

At the end of each monitor cycle, receiver 130 may send monitor exponent 200 (e.g., adjusted monitor exponent 200) and/or its receiver sequence counter number for the last monitor cycle to sender 120. Sender 120 may timely update its monitor exponent 200 for the next monitor cycle. As such, system 100 of FIG. 1 may use monitor exponent 200 to ensures that sender 120 and receiver 130 use the same sequence range for each monitor cycle, which allows system 100 to accurately measure shaper loss and WAN link loss without any active probing.

FIG. 3 illustrates an example method 300 for adjusting a sender shaper rate based on a sender shaper drop value and a WAN link drop value. Method 300 begins at step 310. At step 320, a sender (e.g., sender 120 of FIG. 1) of a network (e.g., network 110 of FIG. 1) determines a sender shaper drop value. The sender shaper drop value represents the number of sequences that have been dropped by a QoS drop policy (e.g., QoS drop policy 124 of FIG. 1) of the sender. The sender may determine a maximum sequence number generated by an encapsulator (e.g., encapsulator 122 of FIG. 1) of the sender, a minimum sequence number generated by the encapsulator, and a sender sequence counter number generated by a sender sequence counter (e.g., sender sequence counter 126 of FIG. 1) of the sender. The sender shaper drop value may then be calculated based on the maximum sequence number, the minimum sequence number, and the sender sequence counter number. For example, the sender may calculate a sequence range number by subtracting the minimum sequence number from the maximum sequence number, add a value of one to the sequence range number to generate a modified sequence range number, and calculate the sender shaper drop value by subtracting the sender sequence counter number from the modified sequence range number. Method 300 then moves from step 320 to step 330.

At step 330 of method 300, the sender determines a WAN link drop value. The WAN link drop value is the number of sequences that were dropped by a WAN link (e.g., WAN link 112 of FIG. 1). In certain embodiments, the WAN drop link value is calculated by subtracting a receiver sequence counter number from the sender sequence counter number. The sender may receive the receiver sequence counter number from a receiver (e.g., receiver 130 of FIG. 1) of the system. In certain embodiments, the receiver sequence counter number is generated by a receiver sequence counter (e.g., receiver sequence counter 136 of FIG. 1) of the receiver. Method 300 then moves from step 330 to step 340.

At step 340 of method 300, the sender determines whether the WAN link drop value indicates a loss in sequences. If the WAN link drop value indicates a loss in sequences (i.e., the WAN link dropped at least one sequence during a first monitoring cycle), method 300 moves to step 345. At step 345 of method 300, the sender adjusts the sender shaper rate down for a second subsequent monitoring cycle to help prevent the WAN link from dropping one or more sequence numbers during the second subsequent monitoring cycle. Method 300 then moves from step 345 to step 370, where method 300 ends. If, at step 340, the sender determines that the WAN link drop value does not indicate a loss in sequences (or is within a predetermined loss threshold), method 300 moves from step 340 to step 350.

At step 350 of method 300, the sender determines whether the sender shaper drop value indicates a loss in sequences. If the sender shaper drop value indicates a loss in sequences (i.e., the QoS drop policy dropped at least one sequence during the first monitoring cycle), method 300 moves to step 355. At step 355 of method 300, the sender adjusts the sender shaper rate up for the second subsequent monitoring cycle to more efficiently utilize the WAN link during the second subsequent monitoring cycle. Method 300 then moves from step 355 to step 370, where method 300 ends. If, at step 350, the sender determines that the sender shaper drop value does not indicate a loss in sequences (or is within a predetermined loss threshold), method 300 moves from step 350 to step 360.

At step 360 of method 300, the sender maintains the sender shaper rate used in the first monitoring cycle for the second subsequent monitoring cycle. Since the sender shaper drop value and the WAN link drop value are measured with no loss (or within a predetermined loss threshold), the user traffic rate is low and there is no need to adjust the sender shaper rate. Method 300 then moves from step 360 to step 370, where method 300 ends. As such, method 300 may be used to determine whether to adjust a sender shaper rate based on a sender shaper drop value and a WAN link drop value without additional overhead to the WAN link, which reduces the impact to user traffic across the WAN link.

Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for adjusting a sender shaper rate based on a sender shaper drop value and a WAN link drop value including the particular steps of the method of FIG. 3, this disclosure contemplates any suitable method for adjusting a sender shaper rate based on a sender shaper drop value and a WAN link drop value including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a LAN, a WAN, a MAN, or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, an LTE network, or a 5G network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A first network component, comprising:
   one or more processors; and
   one or more computer-readable non-transitory storage media coupled to the one or more processors and comprising instructions that, when executed by the one or more processors, cause the first network component to perform operations comprising:
   determining a sender shaper drop value;
   receiving a receiver sequence counter number from a second network component;
   calculating a wide area network (WAN) link drop value by subtracting the receiver sequence counter number from a sender sequence counter number;
   and
   determining whether to adjust a sender shaper rate based on traffic throughput, the sender shaper drop value, and the WAN link drop value.

2. The first network component of claim 1, the operations further comprising:
   determining, based on the WAN link drop value, that a WAN link connecting the first network component to the second network component dropped at least one sequence during a first monitoring cycle; and
   decreasing, in response to determining that the WAN link dropped the at least one sequence, the sender shaper rate for a second monitoring cycle.

3. The first network component of claim 1, the operations further comprising:
   determining, based on the sender shaper drop value, that a Quality of Service (QoS) policy dropped at least one sequence during a first monitoring cycle; and
   increasing, in response to determining that the QoS policy dropped the at least one sequence, the sender shaper rate for a second monitoring cycle.

4. The first network component of claim 1, the operations further comprising:
   determining, based on the WAN link drop value and the sender shaper drop value, that a number of packets encapsulated at the first network component equals a number of packets decapsulated at the second network component during a first monitoring cycle; and
   continuing, in response to determining that the number of packets encapsulated at the first network component equals the number of packets decapsulated at the second network component, the sender shaper rate for a second monitoring cycle.

5. The first network component of claim 1, the operations further comprising:
   subtracting a minimum sequence number from a maximum sequence number to generate a sequence range number;
   adding a value of one to the sequence range number to generate the modified sequence range number; and
   calculating the sender shaper drop value by subtracting the sender sequence counter number from the modified sequence range number.

6. The first network component of claim 1, wherein:
   the first network component is associated with the sender sequence counter number;
   the second network component is associated with a receiver sequence counter number; and
   the sender sequence counter number and the receiver sequence counter number are associated with the same sequence range.

7. A method, comprising:
   determining, by a first network component, a sender shaper drop value;
   receiving a receiver sequence counter number from a second network component;
   calculating a wide area network (WAN) link drop value by subtracting the receiver sequence counter number from a sender sequence counter number;
   and
   determining, by the first network component, whether to adjust a sender shaper rate based on traffic throughput, the sender shaper drop value, and the WAN link drop value.

8. The method of claim 7, further comprising:
   determining, based on the WAN link drop value, that a WAN link connecting the first network component to the second network component dropped at least one sequence during a first monitoring cycle; and
   decreasing, in response to determining that the WAN link dropped the at least one sequence, the sender shaper rate for a second monitoring cycle.

9. The method of claim 7, further comprising:
   determining, based on the sender shaper drop value, that a Quality of Service (QoS) policy dropped at least one sequence during a first monitoring cycle; and
   increasing, in response to determining that the QoS policy dropped the at least one sequence, the sender shaper rate for a second monitoring cycle.

10. The method of claim 7, further comprising:
    determining, based on the WAN link drop value and the sender shaper drop value, that a number of packets encapsulated at the first network component equals a number of packets decapsulated at the second network component during a first monitoring cycle; and continuing, in response to determining that the number of packets encapsulated at the first network component equals the number of packets decapsulated at the second network component, the sender shaper rate for a second monitoring cycle.

11. The method of claim 7, further comprising:
subtracting a minimum sequence number from a maximum sequence number to generate a sequence range number;
adding a value of one to the sequence range number to generate a modified sequence range number; and
calculating the sender shaper drop value by subtracting the sender sequence counter number from the modified sequence range number.

12. The method of claim 7, wherein:
the first network component is associated with the sender sequence counter number;
the second network component is associated with a receiver sequence counter number; and
the sender sequence counter number and the receiver sequence counter number are associated with the same sequence range.

13. One or more computer-readable non-transitory storage media embodying instructions that, when executed by a processor, cause the processor to perform operations comprising:
determining a sender shaper drop value;
receiving a receiver sequence counter number from a second network component;
calculating a wide area network (WAN) link drop value by subtracting the receiver sequence counter number from a sender sequence counter number; and
determining whether to adjust a sender shaper rate based on traffic throughput, the sender shaper drop value, and the WAN link drop value.

14. The one or more computer-readable non-transitory storage media of claim 13, the operations further comprising:
determining, based on the WAN link drop value, that a WAN link connecting a first network component to the second network component dropped at least one sequence during a first monitoring cycle; and
decreasing, in response to determining that the WAN link dropped the at least one sequence, the sender shaper rate for a second monitoring cycle.

15. The one or more computer-readable non-transitory storage media of claim 13, the operations further comprising:
determining, based on the sender shaper drop value, that a Quality of Service (QoS) policy dropped at least one sequence during a first monitoring cycle; and
increasing, in response to determining that the QoS policy dropped the at least one sequence, the sender shaper rate for a second monitoring cycle.

16. The one or more computer-readable non-transitory storage media of claim 13, the operations further comprising:
determining, based on the WAN link drop value and the sender shaper drop value, that a number of packets encapsulated at a first network component equals a number of packets decapsulated at the second network component during a first monitoring cycle; and
continuing, in response to determining that the number of packets encapsulated at the first network component equals the number of packets decapsulated at the second network component, the sender shaper rate for a second monitoring cycle.

17. The one or more computer-readable non-transitory storage media of claim 13, the operations further comprising:
subtracting a minimum sequence number from a maximum sequence number to generate a sequence range number;
adding a value of one to the sequence range number to generate a modified sequence range number; and
calculating the sender shaper drop value by subtracting the sender sequence counter number from the modified sequence range number.

* * * * *